US00RE37576E

(19) United States
(12) Reissued Patent
Stephens et al.

(10) Patent Number: US RE37,576 E
(45) Date of Reissued Patent: Mar. 12, 2002

(54) SINGLE PHASE MOTOR WITH POSITIVE TORQUE PARKING POSITIONS

(75) Inventors: Charles M. Stephens, Pattersonville, NY (US); Wen Liang Soong, Fullarton (AU)

(73) Assignee: General Electric Company, Schenectady, NY (US)

(21) Appl. No.: 09/573,469

(22) Filed: May 17, 2000

Related U.S. Patent Documents

Reissue of:
(64) Patent No.: 5,773,908
Issued: Jun. 30, 1998
Appl. No.: 08/760,755
Filed: Dec. 5, 1996

U.S. Applications:

(63) Continuation-in-part of application No. 08/678,524, filed on Jul. 9, 1996, which is a continuation of application No. 08/352,393, filed on Dec. 8, 1994, now abandoned, which is a continuation of application No. 08/023,790, filed on Feb. 22, 1993, now abandoned.

(51) Int. Cl.[7] ..... H02K 1/12
(52) U.S. Cl. ..... 310/254; 310/49 R; 310/168; 310/156.01; 310/179
(58) Field of Search ..... 310/49 R, 156, 310/254, 264

(56) References Cited

U.S. PATENT DOCUMENTS

| | | | | |
|---|---|---|---|---|
| 2,660,044 A | | 11/1953 | Williams | |
| 2,669,856 A | | 2/1954 | Williams | |
| 3,134,385 A | * | 5/1964 | Cushing | 134/58 |
| 3,184,933 A | | 5/1965 | Gaugler | |
| 3,216,226 A | | 11/1965 | Alger et al. | |
| 3,216,227 A | | 11/1965 | Alger et al. | |
| 3,279,225 A | | 10/1966 | Severance et al. | |
| 3,324,690 A | | 6/1967 | Button | |
| 3,358,381 A | | 12/1967 | Sowa et al. | |
| 3,503,228 A | | 3/1970 | Lake | |
| 3,805,134 A | | 4/1974 | Osamu et al. | |
| 4,029,977 A | * | 6/1977 | Chai et al. | 310/49 R |
| 4,081,703 A | * | 3/1978 | Madsen et al. | 310/49 R |
| 4,095,161 A | * | 6/1978 | Heine et al. | 318/696 |
| 4,112,319 A | * | 9/1978 | Field | 310/49 R |
| 4,115,715 A | | 9/1978 | Muller | |
| 4,232,536 A | | 11/1980 | Koseki et al. | |
| 4,313,076 A | * | 1/1982 | Rathje | 318/790 |
| 4,317,343 A | | 3/1982 | Gerry | |
| 4,327,302 A | | 4/1982 | Hershberger | |
| 4,371,067 A | | 2/1983 | Gerry | |
| 4,390,826 A | | 6/1983 | Erdman et al. | |
| 4,446,706 A | | 5/1984 | Hartwig | |
| 4,528,485 A | | 7/1985 | Boyd, Jr. | |
| 4,554,805 A | | 11/1985 | Hirooka et al. | |
| 4,626,755 A | * | 12/1986 | Butcher et al. | 318/473 |

(List continued on next page.)

FOREIGN PATENT DOCUMENTS

| | | | | |
|---|---|---|---|---|
| JP | 63-129852 | * | 2/1988 | 310/156 |

*Primary Examiner*—Elvin Enad
(74) *Attorney, Agent, or Firm*—Welsh & Katz, Ltd.; Damian G. Wasserbauer; Carl B. Horton

(57) ABSTRACT

A motor with positive torque parking positions. The motor includes a rotor which is rotatable about an axis of rotation and a stator in magnetic coupling relation with the rotor. The stator includes a plurality of teeth each having a radially extending shaft and an axially extending face. The faces of the stator teeth define an aperture for receiving the rotor and the faces of the stator teeth and the rotor define a air gap therebetween. Each stator tooth has a notch in its face that is approximately at least as wide as the shaft of the stator tooth so that the stator has a magnetic configuration relative to the rotor for parking the rotor in a rest position corresponding to a positive torque starting position. The motor also includes a winding on the shafts of the stator teeth and a control circuit for controlling current in the winding whereby an electromagnetic field is produced for rotating the rotor at a desired speed or torque during the operation of the motor.

45 Claims, 6 Drawing Sheets

U.S. PATENT DOCUMENTS 4,635,349 A * 1/1987 Rabe ..... 29/596
4,644,233 A * 2/1987 Suzuki et al. ..... 318/254
4,704,567 A * 11/1987 Suzuki et al. ..... 318/254
4,713,570 A * 12/1987 Mastromattei ..... 310/154
4,724,678 A * 2/1988 Pohl ..... 62/80
4,728,830 A * 3/1988 Gamble ..... 310/12
4,757,241 A * 7/1988 Young ..... 318/254
4,813,248 A 3/1989 Smith et al.
4,847,527 A 7/1989 Dohogne
4,882,511 A 11/1989 Von der Heide
4,933,584 A * 6/1990 Harms et al. ..... 310/162
4,947,066 A * 8/1990 Ghibu et al. ..... 310/49 R
4,952,830 A 8/1990 Shirakawa
4,982,125 A 1/1991 Shirakawa
4,983,867 A * 1/1991 Sakamoto ..... 310/49 R
4,998,052 A 3/1991 Erdman et al.
RE33,655 E * 8/1991 Hershberger ..... 68/23.7
5,041,749 A 8/1991 Gaser et al.
5,057,733 A * 10/1991 Sonoda et al. ..... 310/269
5,075,605 A 12/1991 Hendricks et al.
5,079,488 A 1/1992 Harms et al.
5,140,243 A * 8/1992 Lyons et al. ..... 318/701
5,184,038 A 2/1993 Matsui et al.
5,293,104 A 3/1994 Dreier
5,294,856 A * 3/1994 Horst ..... 310/181
5,369,325 A * 11/1994 Nagate et al. ..... 310/156
5,376,866 A * 12/1994 Erdman ..... 318/138
5,386,161 A * 1/1995 Sakamoto ..... 310/49 R
5,418,438 A * 5/1995 Hollenbeck ..... 318/432
5,423,192 A * 6/1995 Young et al. ..... 62/228
5,465,019 A * 11/1995 Kliman ..... 310/156
5,483,139 A * 1/1996 Welles, II ..... 318/782
5,492,273 A * 2/1996 Shah ..... 236/44 A
5,497,326 A 3/1996 Berland et al.
5,543,693 A 8/1996 Janca et al.
5,600,218 A 2/1997 Holling et al.
5,619,871 A 4/1997 Forbes et al.
5,633,546 A 5/1997 Horst
5,637,974 A 6/1997 McCann
5,796,194 A 8/1998 Archer et al.
5,824,114 A 10/1998 Pyo
5,859,519 A 1/1999 Archer

* cited by examiner

160
S
N
S
N
S
156
θ
106
158
156

0.75
0.50
0.25
0.00
-0.25
-0.50
-0.75
TORQUE
N/M
162
168
170
166
164
TEM=0
TEM=0
TEM=0
0
100
200
300
400
ROTOR POSITION, ELECTRICAL DEGREES

SINGLE PHASE MOTOR WITH POSITIVE TORQUE PARKING POSITIONS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of commonly assigned application Ser. No. 08/678,524, filed Jul. 9, 1996 (pending), which is a continuation commonly assigned application Ser. No. 08/352,393, filed Dec. 8, 1994 (abandoned), which is a continuation of commonly assigned application Ser. No. 08/023,790, filed Feb. 22, 1993 (abandoned), the entire disclosures of which are incorporated herein by reference.

BACKGROUND OF THE INVENTION

This invention relates generally to motors and stationary assemblies therefor and, particularly, to an improved stationary assembly for providing positive torque parking positions in a single phase electronically commutated motor for use in a horizontal axis washing machine.

In general, a motor such as an electronically commutated or brushless motor has permanent magnets mounted on its rotor. The stator of such a motor has a plurality of teeth and wire-wound coils on the teeth which, when energized with current, interact with the permanent magnet rotor to produce positive or negative torque, depending on the direction of the current with respect to the polarity of the magnets. The polarity of the magnets relative to the stator winding alternates when the rotor moves unidirectionally. Thus, it is necessary to alternate the direction of the stator current in synchronism to maintain a constant direction of torque. An electronic inverter bridge typically controls energization of the stator winding for controlling the direction and amount of torque produced by the motor as well as the rotor shaft speed.

As is known in the art, single phase brushless motors typically have starting problems. The magnetic saliencies formed by the stator teeth cause a cogging torque which forces the permanent magnet rotor to rest, or park, at particular angular positions in the absence of external electrical or mechanical stimulus. This cogging torque is also referred to as an indenting or parking torque. In a single phase motor, the rotor's parking positions can coincide with positions of zero electromagnetic torque production which makes it difficult to start the motor. This problem can also make it more difficult to reverse the rotor's direction of rotation.

One approach to overcome this problem is to provide a starting winding which disadvantageously increases the cost and complexity of the motor.

Another approach is to provide parking cuts in the stator teeth or to provide additional parking magnets or parking laminations. Although several motor configurations are known for parking a motor's rotor in a particular position, these motor configurations increase the cost of the motor and/or fail to provide parking positions with sufficient starting torque, especially for low torque motors such as single phase electronically commutated motors.

In general, brushless DC motors are disclosed in, for example, U.S. Pat. Nos. 5,423,192, 4,933,584 and 4,757, 241, all of which are commonly assigned with the present invention described herein and the entire disclosures of which are incorporated herein by reference. In particular, single phase motors are disclosed in, for example, U.S. Pat. Nos. 5,483,139, 5,465,019, 5,140,243, 4,724,678, 4,635,349, 4,626,755, 4,313,076 and 3,134,385, all of which are commonly assigned with the present invention described herein and the entire disclosures of which are incorporated herein by reference.

SUMMARY OF THE INVENTION

Among the several objects of this invention may be noted the provision of an improved motor which provides a positive torque parking position; the provision of such a motor which is particularly well suited for use in a horizontal axis washing machine; and the provision of such a motor system which is economically feasible and commercially practical.

Briefly described, a motor embodying aspects of the present invention includes a rotor which is rotatable about an axis of rotation and a stator in magnetic coupling relation with the rotor. The stator includes a plurality of teeth each having a radially extending shaft and an axially extending face. The faces of the stator teeth define an aperture for receiving the rotor and the faces of the stator teeth and the rotor define an air gap therebetween. Each stator tooth also has a notch in its face that is approximately at least as wide as the shaft of the stator tooth so that the stator has a magnetic configuration relative to the rotor for parking the rotor in a rest position corresponding to a positive torque starting position. The motor also includes a winding on the shafts of the stator teeth and a control circuit for controlling current in the winding whereby an electromagnetic field is produced for rotating the rotor at a desired speed or torque during operation of the motor.

In another embodiment, the invention is directed a stationary assembly for a motor having a rotor which is rotatable about an axis of rotation and which is in magnetic coupling relation with the stationary assembly. The stationary assembly includes a stator core that has a plurality of teeth each having a radially extending shaft and an axially extending face. The faces of the teeth define an aperture for receiving the rotor and the faces of the teeth and the rotor define an air gap therebetween. Each tooth also has a notch in its face that is approximately at least as wide as the shaft of the tooth so that the stator core has a magnetic configuration relative to the rotor for parking the rotor in a rest position corresponding to a positive torque starting position. The stationary assembly also includes a winding on the shafts of the teeth that is adapted to be energized for producing an electromagnetic field to rotate the rotor at a desired speed or torque during operation of the motor.

Other objects and features will be in part apparent and in part pointed out hereinafter.

BRIEF DESCRIPTION OF THE DRAWINGS

Corresponding reference characters indicate corresponding parts through the drawings.

DETAILED DESCRIPTION OF PREFERRED EMBODIMENTS

Figure 1:
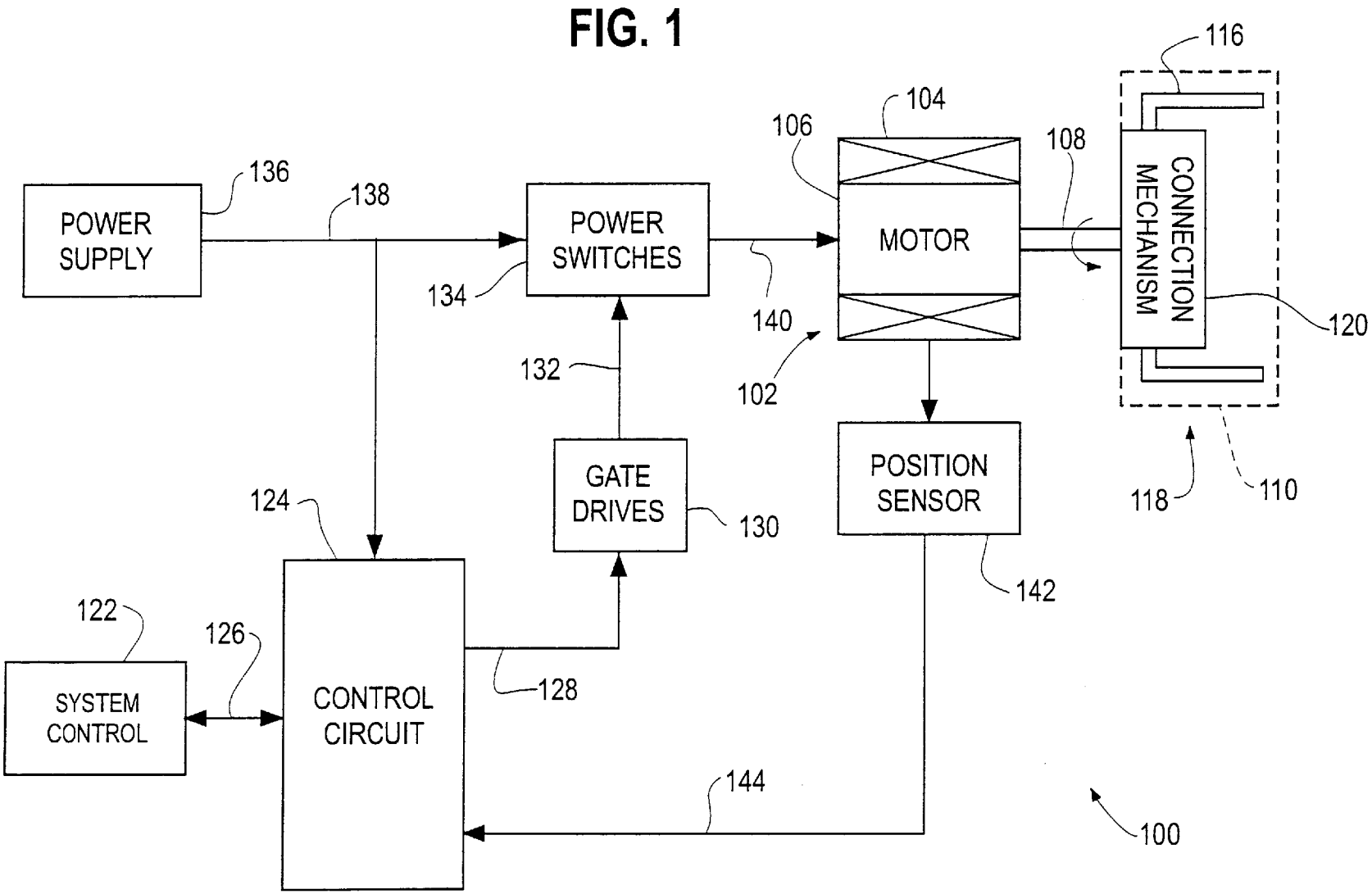
FIG. 1 is a block diagram of a motor system according to a preferred embodiment of the invention.

Referring now to the drawings, FIG. 1 shows a motor system 100 according to a preferred embodiment of the present invention. The system 100 includes a motor, generally designated 102, having a stationary assembly, or stator, 104 and a rotatable assembly, or rotor, 106 in magnetic coupling relation to the stator 104. In the embodiment described herein, the motor 102 is a single phase, permanent magnet motor. It is to be understood, however, that aspects of the present invention may be applied to electronically controllable motors or dynamoelectric machines such as single phase permanent magnet motors, external rotor motors (i.e., inside out motors), single and variable speed motors, selectable speed motors having a plurality of speeds, brushless dc motors and electronically commutated motors. Such motors may also provide one or more finite, discrete rotor speeds selected by an electrical switch or other control circuit.

In a preferred embodiment of the invention, a motor shaft 108 mechanically connects the rotor 106 to a particular device to be driven, such as a rotatable component 110. For example, the rotatable component 110 comprises a basket 116 which is part of a horizontal axis automatic washing or laundry machine, generally indicated 118. Preferably, rotatable component 110 also includes a connection mechanism 120 for coupling the basket 116 to the shaft 108. The connection mechanism 120 may comprise a fixed ratio speed reducer, such as a gear box or a pulley arrangement or, in some applications, shaft 108 of motor 102 may be directly coupled to basket 116. Although disclosed for use with basket 116, it is to be understood that motor 102 may be part of a number of different systems for driving a rotatable component. For example, rotatable component 110 may be an agitator and/or basket of a vertical axis washing machine or a fan, blower, compressor or the like. Commonly assigned U.S. Pat. Nos. RE 33,655, 5,492,273, 5,418,438, 5,423,192, and 5,376,866, the entire disclosures of which are incorporated herein by reference, describe various rotatable components for which the present invention is suited for use.

In laundering apparatus such as the laundry machine 118, basket 116 is rotatable within a tub (not shown) which holds water for washing the fabrics to be laundered. Basket 116 first agitates water and fabrics to be laundered and then spins them to cause a centrifugal displacement of water from the tub.

Preferably, a user interface, or system control, 122 provides system control signals in the form of motor commands to a control circuit 124 via line 126. In this instance, the system control 122 provides signals representing desired washing times, desired washing cycles, and the like. As represented by the block diagram of FIG. 1, the control circuit 124 provides motor control, or commutation, signals via line 128 for electronically controlling a plurality of gate drives 130. In turn, the gate drives 130 provide drive signals via line 132 for switching a plurality of power switches 134, such as IGBT's, BJT's or MOSFET's. In addition to providing drive signals which have been shifted from, for example, 5 volts to 15 volts for driving the power switches 134, gate drives 130 also condition the signals provided by control circuit 124 via line 128 for optimal operation of power switches 134.

As shown in FIG. 1, a power supply 136 provides high voltage DC power via line 138 to power switches 134. By selectively switching the power supply 136 in connection with the winding (see FIG. 2) included in stator 104, power switches 134 provide power via line 140 to motor 102. Preferably, power switches 134 energize the motor winding in a preselected sequence for commutating motor 102 in response to control circuit 124. In this instance, control circuit 124 selectively activates power switches 134 to control rotation in motor 102 as a function of a commutation signal. It is to be understood that power supply 136 may also provide power to operate control circuit 124.

Referring further to FIG. 1, a position sensor 142 provides control circuit 124 with feedback via line 144 representative of the angular position of rotor 106 relative to stator 104. In a preferred embodiment, the position sensor 142 comprises one or more Hall sensors providing a rotor position feedback signal which has a predefined angular relationship relative to the motor back electromotive force (EMF) (e.g., in phase or 90° out of phase with the back EMF). Other position sensors, such as optical sensors, may also be used to provide rotor position feedback instead of or in addition to the Hall sensors. Commonly assigned application Ser. No. 08/680,010, filed Jul. 15, 1996, the entire disclosure of which is incorporated herein by reference, describes a quadrature winding suitable for generating a position signal in a single phase motor according to the invention.

Preferably, control circuit 124 generates its commutation signals as a function of the zero crossings of the back EMF of the winding. As such, the product of the current and the back EMF determines torque production in motor 102. In order to sustain positive torque, it is necessary to energize the winding when the back EMF has crossed zero in the direction that will oppose the voltage energizing it. Since it is desired that motor current crosses zero at the time the motor back EMF also crosses zero, control circuit 124 preferably commutates motor 102 at an angle relative to the next back EMF zero crossing. In other words, control circuit 124 estimates subsequent back EMF zero crossings based on the sensed position of rotor 106 and generates gate drive signals at line 128 for driving power switches 134 coincident with or in advance of the estimated back EMF zero crossings. Thus, control circuit 124 generates the commutation signals as a function of the sensed position of rotor 106 as represented by the position signal. As an example, commonly assigned U.S. Pat. No. 5,423,192, the entire disclosure of which is incorporated herein by reference, describes one preferred means for detecting zero crossings.

In operation, control circuit 124 generates commutation signals via line 128 in response to the system control signals. The commutation signals cause system 100 to produce a motor current that matches the load torque demand as a function of a regulated current reference level. By matching torque load with produced torque, motor 102 is able to operate at a desired torque or speed. The commutation signals preferably include a series of pulse width modulated cycles, wherein each cycle causes a corresponding switching event of power switches 134. In turn, the current in the winding produces an electromagnetic field for rotating the rotor 106 of motor 102. To control the speed of rotatable component 110, system 100 preferably controls the speed of motor 102 by controlling the power delivered to the load. In particular, system 100 regulates current in motor 102, which in turn regulates torque, to obtain the desired motor speed by matching the load and motor loss demand torque at the desired speed. Preferably, control circuit 124 is embodied by a microprocessor or microcontroller and/or an application specific integrated circuit (ASIC) or universal electronically commutated motor integrated circuit (UECM IC).

In one embodiment, the regulated current reference level is a peak regulated current for normal motoring operation communicated by a pulse width modulated signal having a variable duty cycle representative of the desired level. For example, the duty cycle of may vary from 0% to 100% where 100% corresponds to a maximum peak regulated current value and the duty cycle is proportional to the desired current in motor 102. In the alternative, control circuit 124 generates a variable voltage signal, the magnitude of which represents the desired current. Other suitable means for providing the peak regulated current level include a simple resistor circuit or potentiometer.

Commonly assigned application Ser. No. 08/647,694, filed May 15, 1996, the entire disclosure of which is incorporated herein by reference, discloses a system for regulating motoring current and controlling circulating currents in a single phase motor. Commonly assigned application Serial No. (TO BE ASSIGNED) entitled "Single Phase Motor for Laundering Apparatus," filed Dec. 5, 1996, the entire disclosure of which is incorporated herein by reference, describes a suitable motor and control for use with the present invention.

Figure 2:
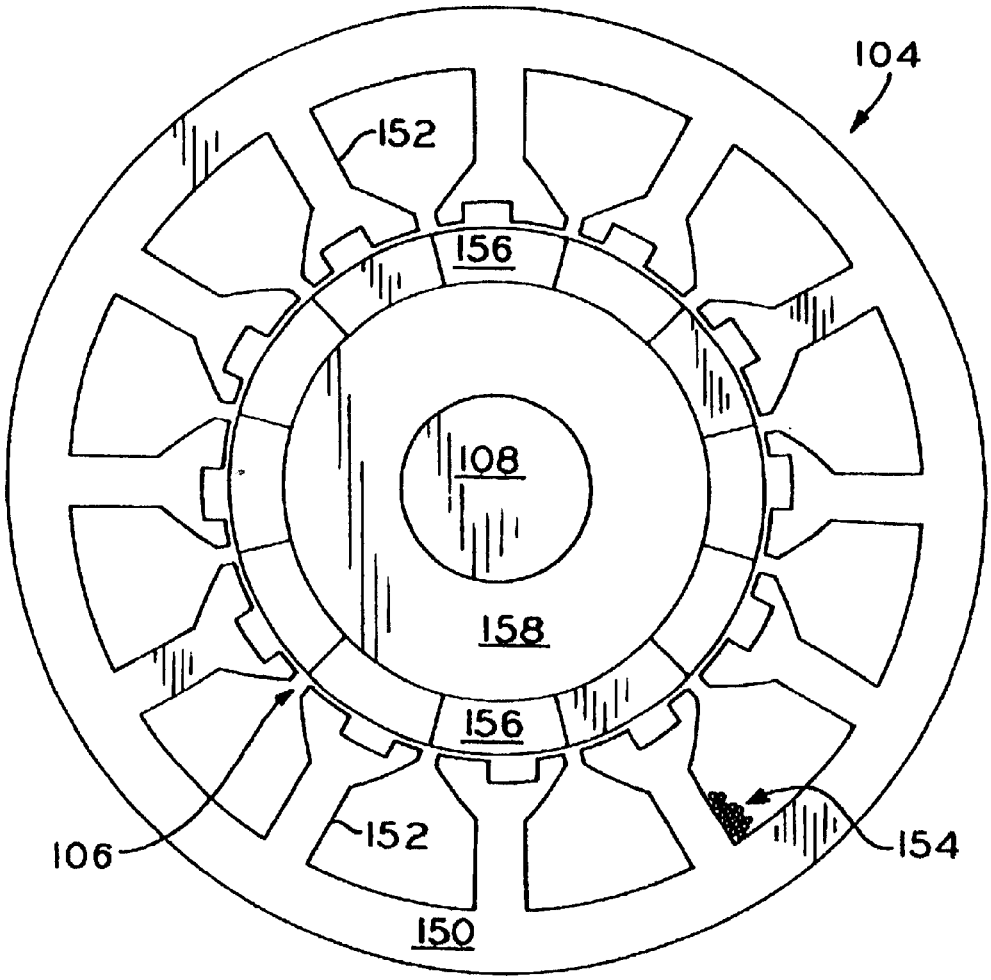
FIG. 2 is a top view of portions of the motor of FIG. 1 including a stator and a rotor having permanent magnets situated thereon.

FIG. 2 illustrates portions of motor 102 which includes stator 104 and rotor 106. In a preferred embodiment, stator 104 and rotor 106 are magnetically coupled and rotor 106 rotates about a central axis of rotation (see FIG. 3) coaxial with shaft 108. Stator 104 includes a stator core 150 having a plurality of teeth 152 which are wrapped by a winding, portions of which are generally indicated 154. As such, electrically energizing winding 154 generates an electromagnetic field for rotating rotor 106. Although motor 102 is shown in a standard configuration with rotor 106 within stator 104 and with the stator teeth 152 extending radially inwardly, it is contemplated that the invention may be used on an inside-out motor wherein stator 104 is within rotor 106.

In view of the shape of stator teeth 152, the conventional way to wind the pole is to "sew" the wire constituting winding 154 around each stator tooth 152 for the required number of turns. Commonly assigned application Ser. No. 08/678,524 describes an alternative method of installing winding 154 on stator teeth 152 using a high speed bobbin coil winding machine.

Preferably, the stator core 150 is a stack of steel laminations held together by winding 154 itself, welding, adhesive bonding or another suitable means. Alternatively, stator core 150 is an integral piece of steel. Those skilled in the art will understand all suitable means for holding the laminations together. While stator 104 is illustrated for purposes of disclosure, it is contemplated that other stationary assemblies of various other constructions having different shapes or winding patterns and with different numbers of teeth may be utilized within the scope of the invention so as to meet at least some of the objects thereof.

In one preferred embodiment, rotor 106 includes a number of permanent magnet elements 156. In the illustrated embodiment, twelve permanent magnet elements 156 are situated on a rotor core 158 of rotor 106. Energizing winding 154 establishes magnetic poles which provide a radial magnetic field relative to the permanent magnets 156. When the field intersects with the flux field of the magnet poles, rotor 106 rotates relative to stator 104 according to the relative polarity of the field and magnet poles to develop a torque in a desired direction. The developed torque is a direct function of the intensities or strengths of the magnetic fields. For example, in an electronically commutated motor, winding 154 is commutated without brushes by sensing the rotational position of rotor 106 as it rotates within stator core 150. Power switches 134 control the direction of current flow through winding 154 and, thus, control the direction of the magnetic field generated by stator 104. Because the position of rotor 106 is known via position sensor 142, control circuit 124 is able to control the magnetic field in stator 104 to cause rotor 106 to rotate in a desired direction.

Figure 3:
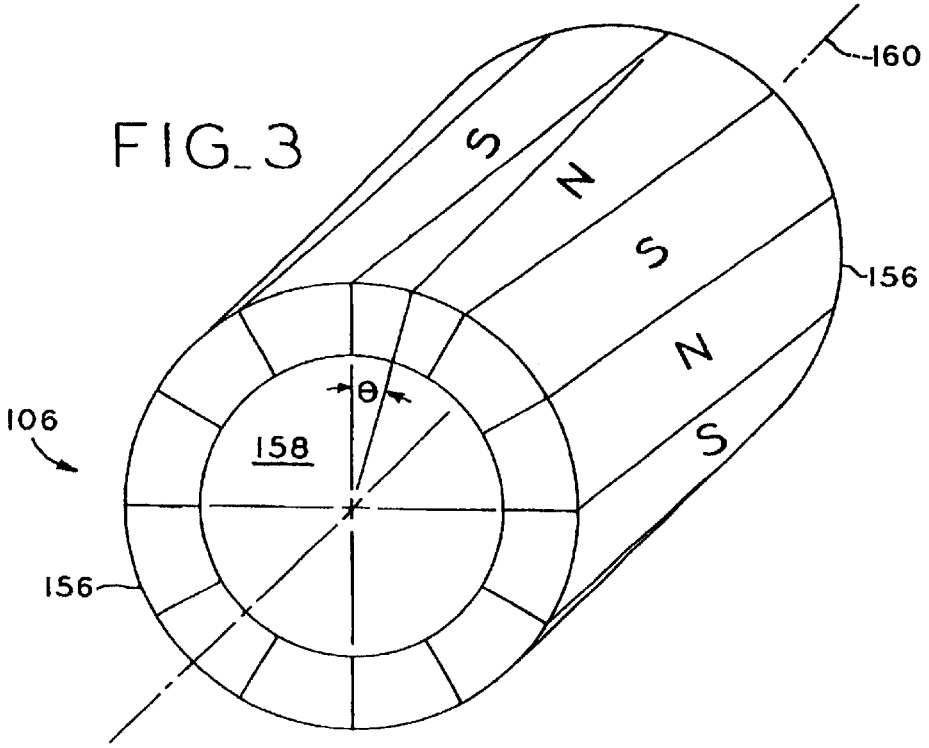
FIG. 3 is a perspective view of the rotor illustrating skew of its magnets.

FIG. 3 illustrates a preferred embodiment of rotor 106 employing a skewed magnet imprint. As shown, the transitions between the north and south poles of adjacent magnets 156 follow a generally helical path resulting in a magnet imprint skew of θ. For example, in a twelve pole motor, a skew of θ=15° (mechanical) corresponds to a skew of 90° (electrical). Also, rotor 106 rotates about an axis 160 coaxial with shaft 108.

Figure 4:
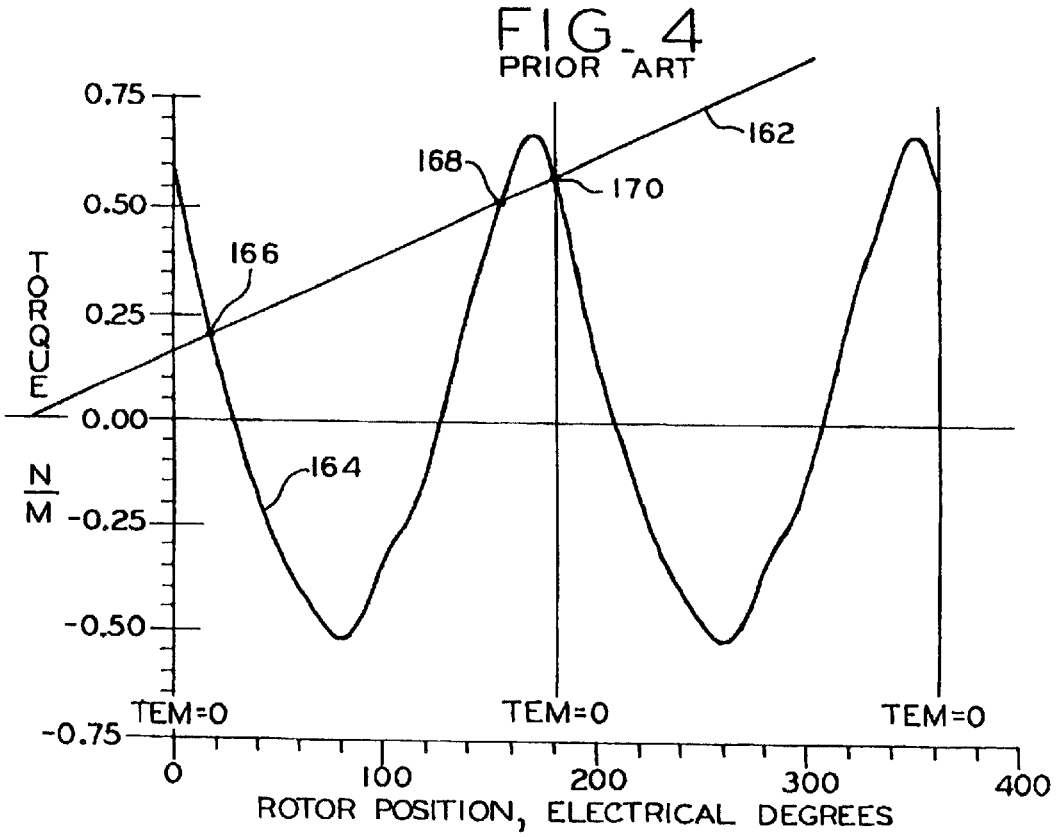
FIG 4 PRIOR ART
FIG. 4 is a graph illustrating an electromagnetic characteristic during steady state performance for a motor with a conventional stator.

A factor in designing a single phase, single winding motor, concerns potential problems during start up or reversal. The magnetic saliencies formed by the stator teeth cause a cogging torque which forces the permanent magnet rotor to rest, or park, at particular angular positions. This cogging torque is also referred to as an indenting or parking torque. In a single phase motor, the parking positions can coincide with positions of zero electromagnetic torque production which makes it difficult to start the motor. Similarly, a zero torque parking position makes it more difficult to reverse the direction in which the motor rotates. FIG. 4 illustrates an exemplary load gravitational moment curve 162 relative to an exemplary cogging, or parking, torque curve 164 for a conventional single phase motor in a horizontal axis washer.

In this example, the gravitational moment is associated with laundry in the horizontal axis washer's basket at a given instant in time. It is to be understood that the actual gravitational moment changes as the basket rotates. Generally, the gravitational moment is defined with respect to the basket by:

$$W * r_d * \sin(\theta_d)$$

where W is the effective weight of the load (i.e., the wet laundry) in the basket; $r_d$ is the effective radius of the load (i.e., the distance from the center of the basket to the load's center of mass); and ed is the angle between the load's center of mass and the center of the basket where 0° is at the lowest vertical position. As is well known in the art, the above expression is reflected into a motor coordinate system as a function of the pulley ratio ρ of the connection mechanism coupling the motor to the basket, the number of pole pairs of the motor and an arbitrary intercept which varies from one tumble to the next.

Referring further to FIG. 4, the rotor will tend to come to rest at, for example, parking positions 166, 168, 170 without any external electrical or mechanical stimulus. As shown, the parking positions 166, 168, 170 occur at the intersections of the parking torque curve 164 and the load gravitational moment curve 162. In this instance, stable parking positions can occur where parking torque curve 164 has a negative slope and intersects gravitational moment curve 162, i.e., parking positions 166, 170. On the other hand, position 168 is unstable and the rotor is not likely to park in this position. Thus, as shown in FIG. 4, the single phase motor can park in an undesirable parking position which corresponds to zero electromagnetic torque (e.g., at a rotor position of 180° (electrical)) resulting in a stalled rotor.

According to the invention, motor system 1 overcomes the potential start up problem by forcing the parking positions of the permanent magnet rotor 106 away from the electromagnetic torque nulls. As those skilled in the art recognize, a stator has a plurality of teeth having faces defining an aperture for receiving a rotor. The faces of the stator teeth and the rotor define an air gap therebetween. In the present invention, a relatively large notch is cut into the stator teeth which affects the air gap reluctivity between the stator and the rotor. This change in the air gap causes the rotor to parking a new position relative to the electromagnetic torque of the motor.

Figure 5:
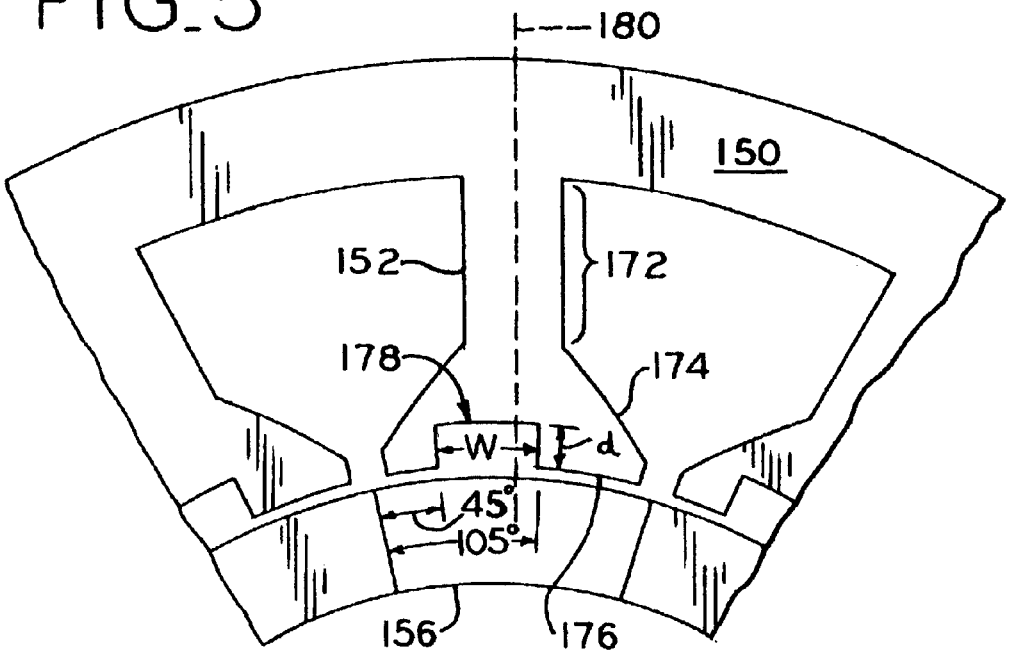
FIG. 5 is an enlarged, partial top view of the stator having notches for preferentially parking the rotor according to a preferred embodiment of the invention.

FIG. 5 illustrates a portion of stator 104, particularly stator core 150, according to a preferred embodiment of the invention. Each tooth 152 has a relatively slender shaft 172 and a relatively wide tip 174. As shown, a radially facing surface 176 on each tooth tip 174 defines the air gap between stator 104 and the permanent magnets 156 of rotor 106. The wide tip 174 spreads the flux into the energy conversion air gap region between rotor magnet 156 and stator tooth 152. According to the invention, a notch, generally indicated 178, in tooth tip 174 provides a modified air gap reluctivity between rotor magnets 156 and stator tooth 152.

The parking positions of rotor 106 and corresponding start up torque may be determined from magnetic field calculations based on a filamentary magnetic circuit approach. Using such an approach, the periphery of rotor magnet 156 and the air gap are divided into a plurality of filaments (not shown). In general, the filaments are spatial entities having equal peripheral span but different radial length depending on the location of the filament in the magnetic geometry. For each filament, magnetic circuit lengths in the air gap and in rotor magnet 156 are determined. The classical magnetic circuit equation for a permanent magnet is then solved to obtain the flux density and the magnetic energy in each filament. The flux linkage at position $\theta=\alpha$ may be calculated by the following summation over all the filaments:

$$\lambda g_m(\theta = \alpha) = N_{turns} \times \sum_{0}^{filaments} B_g A_g \quad \{1\}$$

Likewise, the magnetic energy at a position $\theta=\alpha$ is calculated by a similar summation over the filaments. These field calculations are performed repeatedly at regular increments in the rotor position over an entire electrical cycle. Numerical processing produces cyclic waveforms of the flux linkage, magnetic energy, flux linkage differential, and cogging torque.

Referring further to FIG. 5, the notch 178 in each stator tooth 152 is relatively large and is offset relative to a center line 180 through tooth 152. In a preferred embodiment, the width w of notch 178 is approximately as wide as the shaft 172 of tooth 152. In certain applications, it may be desired for width w to be significantly wider than shaft 172. Preferably, the width w and the depth d of notch 178 are inversely related so that as the width w is increased, the depth d is decreased. As such, the motor geometry of FIG. 5 provides a desirable parking torque characteristic according to the present invention.

As an example, the shaft 172 of each stator tooth 152 is approximately 0.275 inches wide and the diameter of stator core 150 from surface 176 of one tooth 152 to surface 176 of an opposite tooth 152 is approximately 3.125 inches. In this example, notch 178 has a desired width of approximately 60° (electrical) which corresponds to approximately 10° (mechanical). Thus, the width w of notch 178 is approximately 0.273 inches. The motor configuration of FIG. 5 also employs a relatively large skew of the magnet imprint (e.g., 90° (electrical)) to obtain the desired parking torque characteristic.

Figure 6:
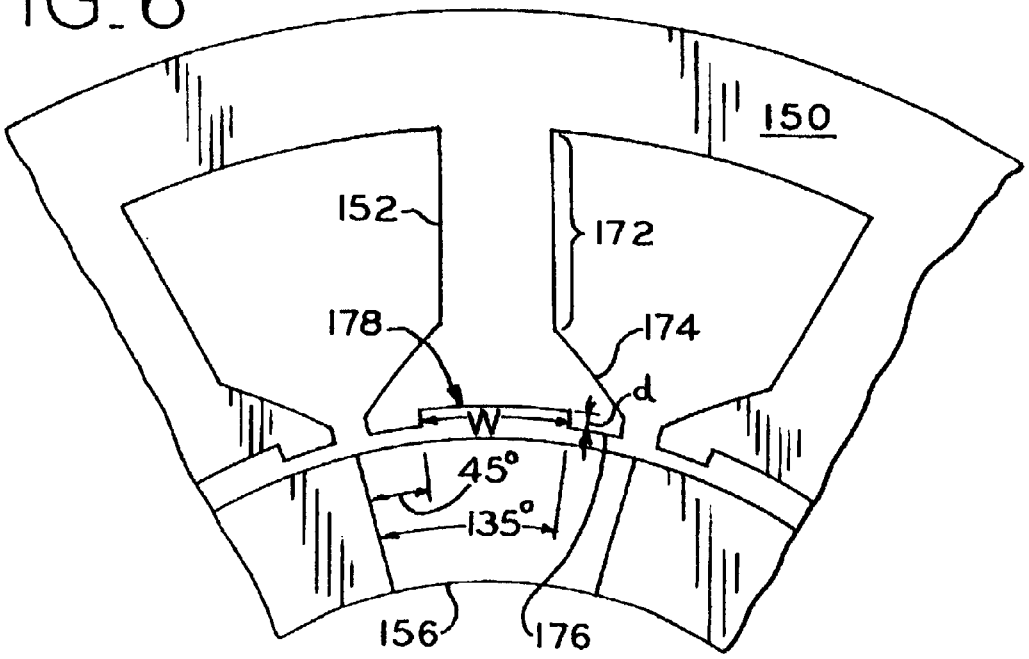
FIG. 6 is an enlarged, partial, top view of the stator having notches for preferentially parking the rotor according to another preferred embodiment of the invention.

FIG. 6 illustrates another preferred motor geometry providing a desirable parking torque characteristic according to the invention. In this instance, notch 178 is relatively shallow but wider than the notch configuration of FIG. 5. As an example of this alternative embodiment, the shaft 172 of each stator tooth 152 is approximately 0.275 inches wide and the diameter of stator core 150 from surface 176 of one tooth 152 to surface 176 of an opposite tooth 152 is approximately 3.125 inches. In this example, notch 178 has a desired width of approximately 90° (electrical) which corresponds to approximately 15° (mechanical). Thus, the width w of notch 178 is approximately 0.409 inches. Preferably, rotor 106 employs less magnet skew (e.g., 60° (electrical)) in the embodiment of FIG. 6 than in the embodiment of FIG. 5 to obtain the desired parking torque characteristic. Further, notch 178 of FIG. 6 need not be offset with respect to the center line 180 of tooth 152. This geometry beneficially provides improved electromagnetic torque production characteristic.

In yet another alternative embodiment, notch 178 may be sized to have a variable, or stepped, depth. In this instance, the notch, stepped air gap and magnet skew are sized to optimize parking torque in various applications.

Figure 7:
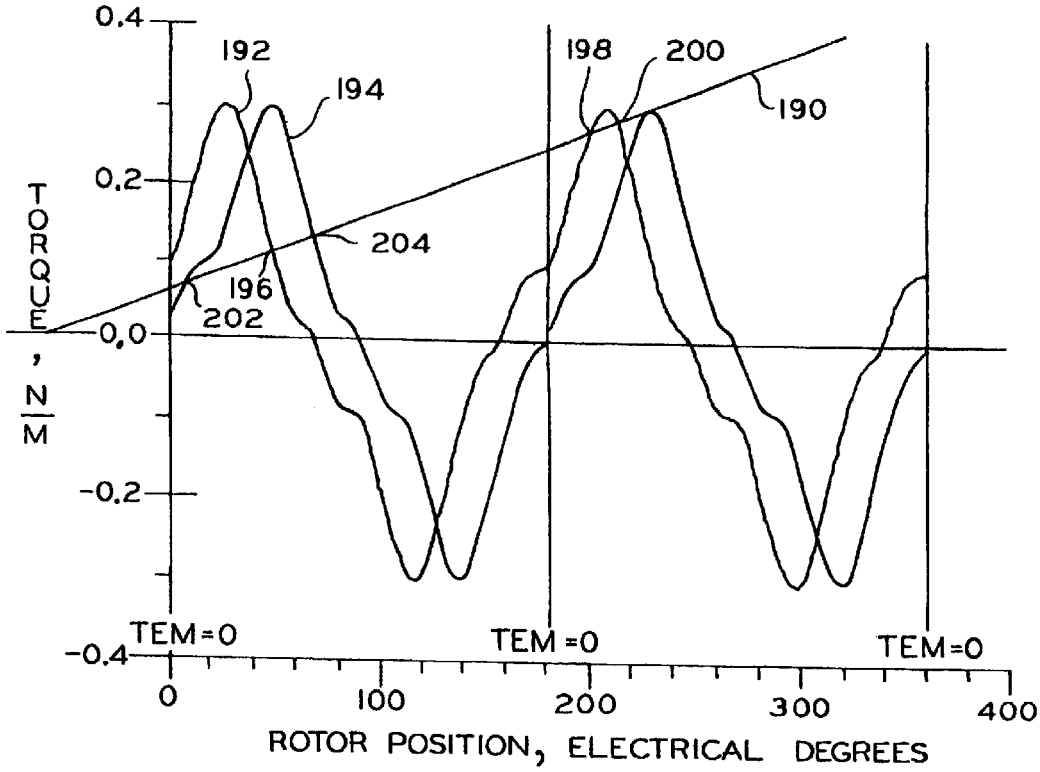
FIG. 7 is a graph illustrating an electromagnetic characteristic during steady state performance for a motor with a notched stator according to the invention.

FIG. 7 illustrates an exemplary load gravitational moment curve 190 relative to exemplary cogging, or parking, torque curves 192, 194 for motor 102 as used in horizontal axis washer 118 according to the present invention. In FIG. 7, the curve 192 represents the parking torque for the motor configuration of FIG. 5 and the curve 194 represents the parking torque for the motor configuration of FIG. 6.

With respect to parking torque curve 192, rotor 106 will tend to come to rest at, for example, parking positions 196, 198, 200 without any external electrical or mechanical stimulus. As shown, the parking positions 194, 196, 200 occur at the intersections of the parking torque curve 192 and the load gravitational moment curve 190. In this instance, stable parking positions can occur where parking torque curve 192 has a negative slope and intersects gravitational moment curve 190, i.e., parking positions 196, 200. On the other hand, position 198 is unstable and rotor 106 is not likely to park in this position. Advantageously, the motor configuration of FIG. 5 causes parking torque curve 192 to be shifted so that the stable parking positions 196, 200 do not intersect the positions of zero electromagnetic torque production. In other words, the entire negative slope portions of curve 192 is between the torque nulls. Thus, as shown in FIG. 7, motor 102 will not park where the electromagnetic torque is zero and a stall situation is much less likely to occur.

With respect to parking torque curve 194, parking positions 202, 204 occur at the intersections of the parking torque curve 194 and the load gravitational moment curve 190. In this instance, a stable parking position can occur where parking torque curve 194 has a negative slope and intersects gravitational moment curve 190, i.e., parking position 204. On the other hand, position 202 is unstable and rotor 106 is not likely to park in this position. Advantageously, the motor configuration of FIG. 6 causes parking torque curve 194 to be shifted so that the stable parking position 204 does not intersect the positions of zero electromagnetic torque production. In other words, the entire negative slope portions of curve 194 is also between the torque nulls. Thus, as shown in FIG. 7, motor 102 will not park where the electromagnetic torque is zero and a stall situation is much less likely to occur.

As is known in the art, Coulomb friction associated with, for example, sliding of the water seals inside laundry machine 118, may affect the gravitational moment of the load in certain situations. As a result, the rotor 106 of motor 102 may park at an unstable parking position that coincides with a position of zero electromagnetic torque production. The present invention provides further improvements to the motor configurations of FIGS. 5 and 6 that cause rotor 106 to park at a stable position of non-zero torque even when Coulomb friction is problematic.

Figure 8:
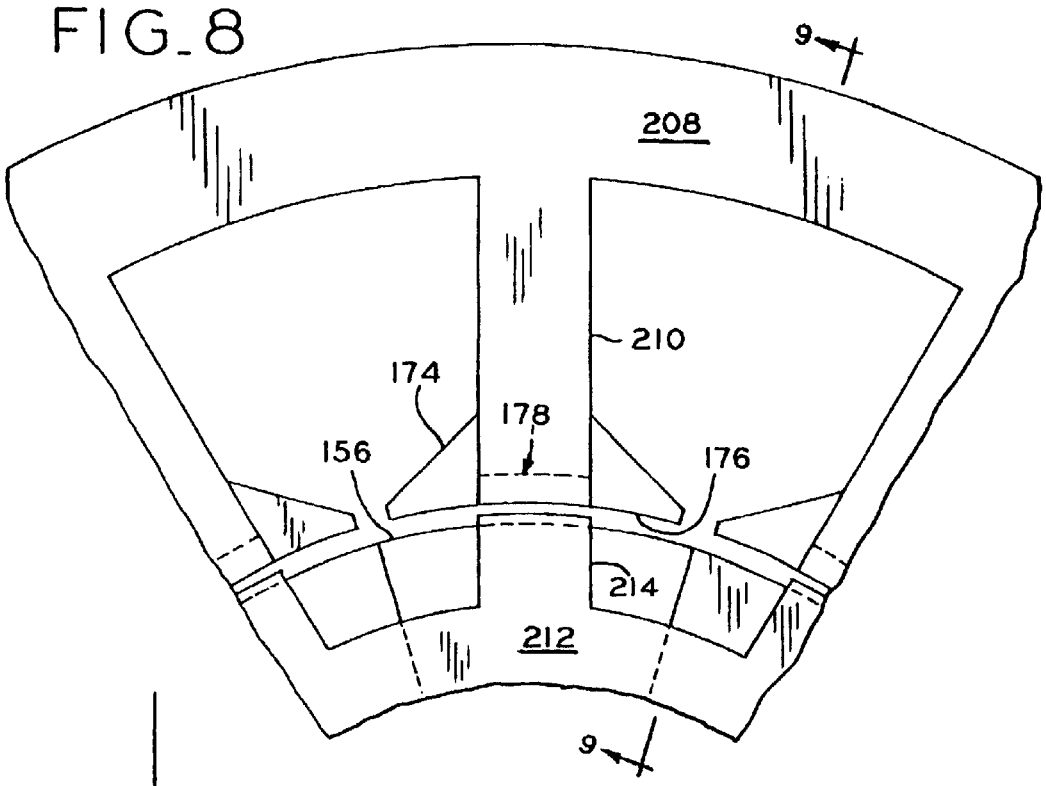
FIG. 8 is an enlarged, partial view of the stator and rotor having a reluctance section.

FIG. 8 illustrates portions of stator 104 and rotor 106. In particular, FIG. 8 is a fragmentary top view of a stator reluctance section 208 having a plurality of legs 210, each corresponding to one of the stator teeth 152. Also shown in FIG. 8 is a fragmentary top view of a rotor reluctance section 212. According to the present invention, the reluctance sections 208, 212 comprise a relatively thin layer of a low reluctivity material such as iron positioned generally axially adjacent to stator core 150 and rotor core 158, respectively, for providing additional electromagnetic torque at selected positions, such as the torque nulls of the magnet section of motor 102.

With respect to stator reluctance section 208, each leg 210 is approximately the same width as the shaft 172 of stator tooth 152 and overlies an axially facing surface of a corresponding one of the stator teeth 152. During construction of this embodiment of motor 102, winding 154 is wrapped around both stator teeth 152 and reluctance section leg 210.

Similarly, rotor reluctance section 212 overlies an end of each permanent magnet 156 of rotor 106. In a preferred embodiment, rotor reluctance section 212 includes a plurality of axially projecting legs 214 which extend into the air gap defined between the surface 176 of tip 174 and magnet 156 Preferably, reluctance sections 208, 212 are aligned to provide electromagnetic torque at the positions where motor 102 would otherwise produce no electromagnetic torque, should the situation arise in which Coulomb friction causes rotor 106 to become stuck at a torque null. Although illustrated as being centered on magnet 156, it is to be understood that the reluctance section 212 may be rotated relative to magnets 156 before it is secured to rotor 106 to position each leg 214 at a predetermined position relative to its corresponding permanent magnet 156.

Figure 9:
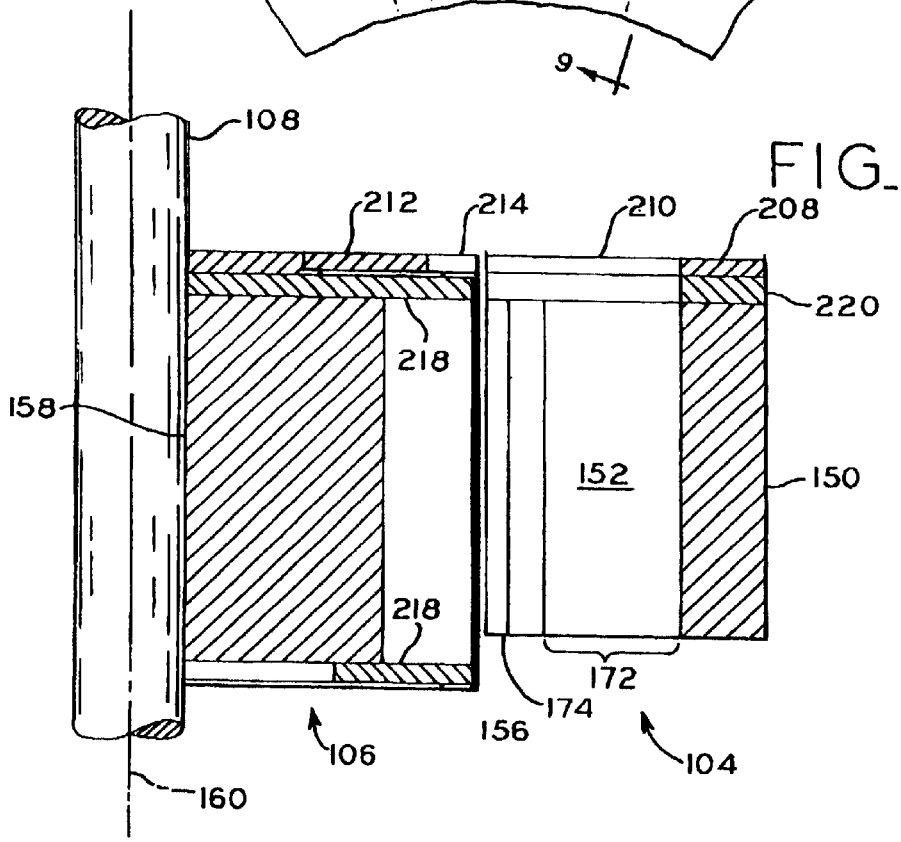
FIG. 9 is a cross section of the stator and rotor taken along the line 9—9 in FIG. 8.

Referring now to FIG. 9, rotor 106 preferably includes a non-magnetic end plate 218 which separates rotor reluctance section 212 from rotor core 158 and magnets 156. For this reason, stator 104 includes a nonmagnetic spacer stack 220 which separates stator reluctance section 208 from stator core 150. As an example, FIG. 9 illustrates magnet 156 having an axial length of approximately 1.65 inches, end plate 218 and spacer stack 220 each having an axial length of approximately 0.1 inches, and reluctance section 208, 212 each having an axial length of approximately 0.075 inches.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A motor comprising:

a rotor rotatable about an axis of rotation;

a stator in magnetic coupling relation with the rotor, said stator including a plurality of teeth each having a radially extending pole body and an axially extending face, said pole bodies of the stator teeth each having a generally uniform thickness throughout its radial extent, said faces of the stator teeth defining an aperture for receiving the rotor, said faces of the stator teeth and said rotor defining an air gap therebetween, each stator tooth having a notch in its face which is approximately at least as wide as the thickness of the pole body of the respective stator tooth, said notch defining a modified air gap reluctivity between the stator and the rotor for parking the rotor in a rest position corresponding to a positive torque starting position;

a winding on the pole bodies of the stator teeth; and a control circuit for controlling current in the winding whereby an electromagnetic field is produced for rotating the rotor at a desired speed or torque during operation of the motor.

2. The motor of claim 1 wherein each notch has a generally rectangular cross section transverse to the axis of rotation.

3. The motor of claim 1 wherein each notch has a width and a depth relative to the face of its respective stator tooth, said depth being a function of the inverse of said width.

4. The motor of claim 1 wherein each notch has a width relative to the face of its respective stator tooth between approximately 60° (electrical) and 90° (electrical).

5. The motor of claim 1 wherein each notch is offset relative to a center line of its respective stator tooth thereby defining an asymmetrical air gap relative to the center line.

6. The motor of claim 1 wherein the stator comprises a generally cylindrical stator core having two axially facing ends and a stator reluctance section positioned axially adjacent one of the ends of the stator core.

7. The motor of claim 6 wherein the pole bodies of the stator teeth extend radially from the stator core so that each stator tooth has two axially facing surfaces and wherein the stator reluctance section has a plurality of legs, each leg of the stator reluctance section corresponding to one of the stator teeth and being positioned axially adjacent one of the axially facing surfaces of its corresponding stator tooth.

8. The motor of claim 7 wherein a portion of each leg of the stator reluctance section is substantially coterminous with the pole body of its corresponding stator tooth.

9. The motor of claim 8 wherein another portion of each leg of the stator reluctance section extends into the air gap between the stator and the rotor at the notch of its corresponding stator tooth.

10. The motor of claim 6 wherein the stator includes a non-magnetic spacer section between the stator core and the stator reluctance section.

11. The motor of claim 6 wherein the rotor comprises a generally cylindrical rotor core having two axially facing ends and a rotor reluctance section positioned axially adjacent one of the ends of the rotor core.

12. The motor of claim 11 wherein the rotor comprises a plurality of permanent magnetic elements situated radially on an outer surface of the rotor core so that each permanent magnet element has two axially facing ends substantially level with the ends of the rotor core and wherein the rotor reluctance section has a plurality of legs, each leg of the rotor reluctance section corresponding to one of the permanent magnet elements and being positioned axially adjacent one of the axially facing ends of its corresponding permanent magnet element.

13. The motor of claim 12 wherein each leg of the rotor reluctance section overlaps at least in part one of the ends of the permanent magnet elements and extends into the air gap between the stator and the rotor.

14. The motor of claim 12 wherein each leg of the rotor reluctance section has a width less than that of its corresponding permanent magnet element.

15. The motor of claim 12 wherein each leg of the rotor reluctance section is situated on one of the ends of its corresponding permanent magnet element at a predetermined angular position relative to the permanent magnet element.

16. The motor of claim 11 wherein the rotor has an end cap on each of its ends and wherein the rotor reluctance section is positioned on one of the end caps.

17. The motor of claim 11 wherein the rotor and stator reluctance sections are positioned radially adjacent each other.

18. The motor of claim 1 wherein the rotor comprises a generally cylindrical rotor core and a plurality of permanent magnet elements situated radially on an outer surface of the rotor core along a helical path which traverses a skew angle θ with respect to the axis of rotation.

19. The motor of claim 18 wherein the skew angle 0 is between approximately 60° (electrical) and 90° (electrical).

20. The motor of claim 1 comprising a single phase, single winding, electronically commutated dynamoelectric machine.

21. A stationary assembly for a motor, said motor having a rotor which is rotatable about an axis of rotation, said stationary assembly being in magnetic coupling relation with the rotor, said stationary assembly comprising:

a stator core having a plurality of teeth, said teeth each having a radially extending pole body and an axially extending face, said pole bodies of the stator teeth each having a generally uniform thickness throughout its radial extent, said faces of the teeth defining an aperture for receiving the rotor, said faces of the teeth and said rotor defining an air gap therebetween, each tooth having a notch in its face which is approximately at least as wide as the thickness of the pole body of the respective stator tooth, said notch defining a modified air gap reluctivity between the stator core and the rotor for and the rotor in a rest position corresponding to a positive torque starting position; and a winding on the pole bodies of the teeth, said winding being adapted to be energized for producing an electromagnetic field to rotate the rotor at a desired speed or torque during operation of the motor.

22. The stationary assembly of claim 21 wherein each notch has a generally rectangular cross section transverse to the axis of rotation.

23. The stationary assembly of claim 21 wherein each notch has a width and a depth relative to the face of its respective tooth, said depth being a function of the inverse of said width.

24. The stationary assembly of claim 21 wherein each notch has a width relative to the face of its respective tooth between approximately 60° (electrical) and 90° (electrical).

25. The stationary assembly of claim 21 wherein each notch is offset relative to a center line of its respective tooth thereby defining an asymmetrical air gap relative to the center line.

26. The stationary assembly of claim 21 wherein the stator core is generally cylindrical and has two axially facing ends and further comprising a reluctance section positioned axially adjacent one of the ends of the stator core.

27. The stationary assembly of clam 26 wherein the teeth extend radially from the stator core so that each tooth has two axially facing surfaces and wherein the reluctance section has a plurality of legs, each leg of the reluctance section corresponding to one of the teeth and being positioned axially adjacent one of the axially facing surfaces of its corresponding tooth.

28. The stationary assembly of claim 27 wherein a portion of each leg of the stator reluctance section is substantially coterminous with the pole body of its corresponding stator tooth.

29. The stationary assembly of claim 28 wherein another portion of each leg of the stator reluctance section extends into the air gap between the stator and the rotor at the notch of its corresponding stator tooth.

30. The stationary assembly of claim 26 wherein the stator includes a non-magnetic spacer section between the stator core and the stator reluctance section.

*31. A washing machine, comprising in combination:*

*a rotatable component mounted for rotation about an axis, the rotation of said rotatable component during operation of said washing machine causing a washing process to occur; and*

*a single-phase brushless DC motor that is directly coupled to said rotatable component so that the rotational speed of a moveable component of said motor is substantially identical to the rotational speed of said rotatable component during operation of said washing machine, said motor including:*

*a stator including a plurality of radially extending pole shoes, wherein each one of said pole shoes is generally T-shaped and comprises a first radial part of relatively narrow circumferential extent and a second radial part of relatively larger circumferential extent, the second radial parts of adjacent pole shoes being circumferentially spaced from each other by an intermediate gap, and wherein the circumferential extent of each of said intermediate gaps is small compared to the circumferential extent of each of said second radial parts,*

*a winding including a plurality of coils disposed on said pole shoes, wherein each one of said coils is wound around a corresponding one of said pole shoes,*

*a bearing and shaft assembly including a shaft aligned on an axis and bearings surrounding said shaft,*

*a rotor that is rotatable about said axis via said bearings and includes a permanent magnetic ring affixed thereto such that a generally cylindrical air gap is defined between adjacent surfaces of said pole shoes and said permanent magnetic ring,*

*a rotor position detector that generates an output signal that is generally representative of the position of said rotor with respect to said stator, wherein changes of state of said output signal are in a fixed relationship with zero crossing points of the back EMF generated by the rotation of the rotor with respect to the stator, and*

*control circuit that is electrically connected to said rotor position detector and receives said output signal, said control circuit selectively energizing said coils to cause said coils to operatively interact with said permanent magnetic ring and thereby cause*

*said shaft and said rotating component to rotate at substantially identical rotational speeds during operation of said washing machine.*

*32. The washing machine of claim 31 wherein said rotor position generates said output signal at least in part by sensing a flow of magnetic flux.*

*33. The washing machine of claim 32 wherein said rotor position detector generates said output signal at least in part by sensing a flow of magnetic flux directly from said permanent magnetic ring.*

*34. The washing machine of claim 33 wherein said rotor position detector comprises a Hall effect device.*

*35. The washing machine of claim 31 wherein said rotor position detector comprises an optical switch assembly.*

*36. The washing machine of claim 31 wherein the changes of state of said output signal substantially coincide with the zero crossing points of the back EMF generated by the rotation of the rotor with respect to the stator.*

*37. The washing machine of claim 31 wherein said shaft is rotatably mounted on said stator.*

*38. The washing machine of claim 31 wherein said permanent magnetic ring has a plurality of permanent magnetic poles defined therein, and wherein a pole gap is defined between each adjacent pair of said permanent magnetic poles.*

*39. The washing machine of claim 38 wherein said pole gaps are skewed.*

*40. The washing machine of claim 31 wherein said rotatable component comprises an agitating wheel.*

*41. The washing machine of claim 31 wherein the surface of said pole shoes adjacent said air gap are contoured.*

*42. The washing machine of claim 31 wherein said rotatable component comprises a rotatable washing container.*

*43. The washing machine of claim 31 wherein said pole shoes coaxially surround said permanent magnetic ring.*

*44. The washing machine of claim 31 wherein the second radial parts of each one of said pole shoes includes a notch, each one of said notches defining a modified air gap reluctivity between the stator and the rotor for parking the rotor in a rest position corresponding to a positive torque starting position.*

*45. The washing machine of claim 31 wherein all of said coils when energized are energized substantially simultaneously.*

* * * * *